(12) United States Patent
Overton et al.

(10) Patent No.: US 10,771,565 B2
(45) Date of Patent: *Sep. 8, 2020

(54) SENDING APPLICATION INPUT COMMANDS OVER A NETWORK

(71) Applicant: Amazon Technologies, Inc., Seattle, WA (US)

(72) Inventors: Adam J. Overton, Redmond, WA (US); Brian D. Fisher, Irvine, CA (US); Isaac J. Shepard, Ladera Ranch, CA (US); Jason C. Jenks, Lynnwood, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/245,638

(22) Filed: Aug. 24, 2016

(65) Prior Publication Data

US 2016/0366228 A1   Dec. 15, 2016

Related U.S. Application Data

(63) Continuation of application No. 14/331,942, filed on Jul. 15, 2014, now Pat. No. 9,454,282, which is a
(Continued)

(51) Int. Cl.
*H04L 29/08* (2006.01)
*G06F 9/44* (2018.01)
(Continued)

(52) U.S. Cl.
CPC ............ *H04L 67/141* (2013.01); *A63F 13/23* (2014.09); *A63F 13/30* (2014.09); *A63F 13/31* (2014.09);
(Continued)

(58) Field of Classification Search
CPC .......................... H04L 67/141; H04L 65/4069
(Continued)

(56) References Cited

U.S. PATENT DOCUMENTS 6,061,722 A    5/2000 Lipa et al.
6,466,817 B1  10/2002 Kaula et al.
(Continued)

OTHER PUBLICATIONS

Persistent Worlds Whitepaper, IGDA Online Games SIG, 2004, 82 pages.
(Continued)

*Primary Examiner* — Kevin T Bates
*Assistant Examiner* — Nazia Naoreen
(74) *Attorney, Agent, or Firm* — Thomas | Horstemeyer, LLP

(57) ABSTRACT

Disclosed are various embodiments that facilitate sending input commands to an application over a network that may have variable latency characteristics. A first computing device sends a request to initiate a remote session with the application being executed by a second computing device. Upon initiation of the remote session, the first computing device receives application output data associated with the application for display via the first computing device. The first computing device may capture an input command associated with a video frame of the application output data being displayed. The input command is transmitted to the second computing device. To account for latency characteristics associated with the network, the second computing device provides the input command to the application after a delay.

20 Claims, 4 Drawing Sheets

Related U.S. Application Data continuation of application No. 12/968,845, filed on Dec. 15, 2010, now Pat. No. 8,806,054.

(51) Int. Cl.
| | |
|---|---|
| G06F 9/451 | (2018.01) |
| A63F 13/23 | (2014.01) |
| A63F 13/30 | (2014.01) |
| A63F 13/31 | (2014.01) |
| G06F 3/0481 | (2013.01) |
| H04N 21/239 | (2011.01) |
| H04N 21/478 | (2011.01) |
| H04N 21/61 | (2011.01) |
| G06F 3/01 | (2006.01) |
| H04L 29/06 | (2006.01) |

(52) U.S. Cl.
CPC .......... *G06F 3/04812* (2013.01); *G06F 9/452* (2018.02); *G06F 3/016* (2013.01); *H04L 65/4069* (2013.01); *H04N 21/2393* (2013.01); *H04N 21/4781* (2013.01); *H04N 21/6175* (2013.01)

(58) Field of Classification Search
USPC ........................................................ 709/232
See application file for complete search history.

(56) References Cited

U.S. PATENT DOCUMENTS

| | | | |
|---|---|---|---|
| 7,680,038 B1* | 3/2010 | Gourlay | H04L 41/0896 370/230 |
| 7,849,491 B2 | 12/2010 | Perlman | |
| 8,150,675 B1 | 4/2012 | Ortmanns et al. | |
| 8,312,214 B1 | 11/2012 | English | |
| 8,506,402 B2* | 8/2013 | Gault | A63F 13/10 463/40 |
| 8,606,958 B1 | 12/2013 | Evans et al. | |
| 8,806,054 B1 | 8/2014 | Overton et al. | |
| 9,131,025 B1 | 9/2015 | Evans et al. | |
| 9,327,195 B2 | 5/2016 | Overton | |
| 9,455,931 B2* | 9/2016 | Bone | H04L 47/803 |
| 2003/0045808 A1 | 3/2003 | Kaula et al. | |
| 2006/0294221 A1 | 12/2006 | Graupner et al. | |
| 2007/0250901 A1* | 10/2007 | McIntire | H04N 7/17318 725/146 |
| 2007/0270135 A1 | 11/2007 | Gaschler | |
| 2009/0118019 A1 | 5/2009 | Perlman et al. | |
| 2010/0197405 A1 | 8/2010 | Douceur et al. | |
| 2011/0071978 A1 | 3/2011 | Lottridge et al. | |
| 2011/0096675 A1 | 4/2011 | Li et al. | |
| 2012/0028712 A1 | 2/2012 | Zuili | |
| 2014/0331138 A1 | 11/2014 | Overton et al. | |
| 2014/0335949 A1 | 11/2014 | Overton | |
| 2015/0381506 A1 | 12/2015 | Evans et al. | |
| 2016/0325182 A1* | 11/2016 | McKenzie | A63F 13/67 |
| 2016/0328214 A1* | 11/2016 | Perry | A63F 13/10 |

OTHER PUBLICATIONS

World of Warcraft, Blizzard Entertainment, 2004, game manual, 114 pages.

* cited by examiner

US 10,771,565 B2

SENDING APPLICATION INPUT COMMANDS OVER A NETWORK

CROSS-REFERENCE TO RELATED APPLICATIONS

This application is a continuation of co-pending U.S. utility application entitled, "SENDING APPLICATION INPUT COMMANDS OVER A NETWORK," having application Ser. No. 14/331,942, filed on Jul. 15, 2014, which is a continuation of U.S. utility application entitled, "SENDING APPLICATION INPUT COMMANDS OVER A NETWORK," having application Ser. No. 12/968,845, filed Dec. 15, 2010, which issued as U.S. Pat. No. 8,806,054 on Aug. 2, 2014, all of which are entirely incorporated herein by reference.

BACKGROUND

Many forms of input devices exist to facilitate user input for an application that has a user interface. Various types of input devices may include joysticks, keyboards, mice, pointing sticks, touch pads, touch screens, light guns, game controllers, microphones, and so on. Such devices are typically directly connected to the computing device on which the application is executed, either through a wired connection or a wireless connection.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to sending input commands to an application over a network that may have variable latency characteristics. An application such as, for example, a game or another type of application may be executed in a server, with the graphical output of the application being captured and sent to a client over the network. In response to viewing the graphical output, a user at the client may send input commands to the application. Because the latency on the network may vary, the relative time between two input commands may differ when received as compared to the relative time between the two input commands when they were generated in the client.

Such variations, which may be referred to as network jitter, may cause the input commands to be interpreted incorrectly by the application. For example, two single clicks of a mouse may be interpreted as a double click if the first single click is delayed more than the second single click. Various embodiments of the present disclosure restore the relative temporal spacing between input commands by inserting an additional delay before providing an input command to the application, if the input command may be misinterpreted. To this end, metadata for restoring relative timing may be transmitted along with the input command from the client to the server. In the following discussion, a general description of the system and its components is provided, followed by a discussion of the operation of the same.

Figure 1:
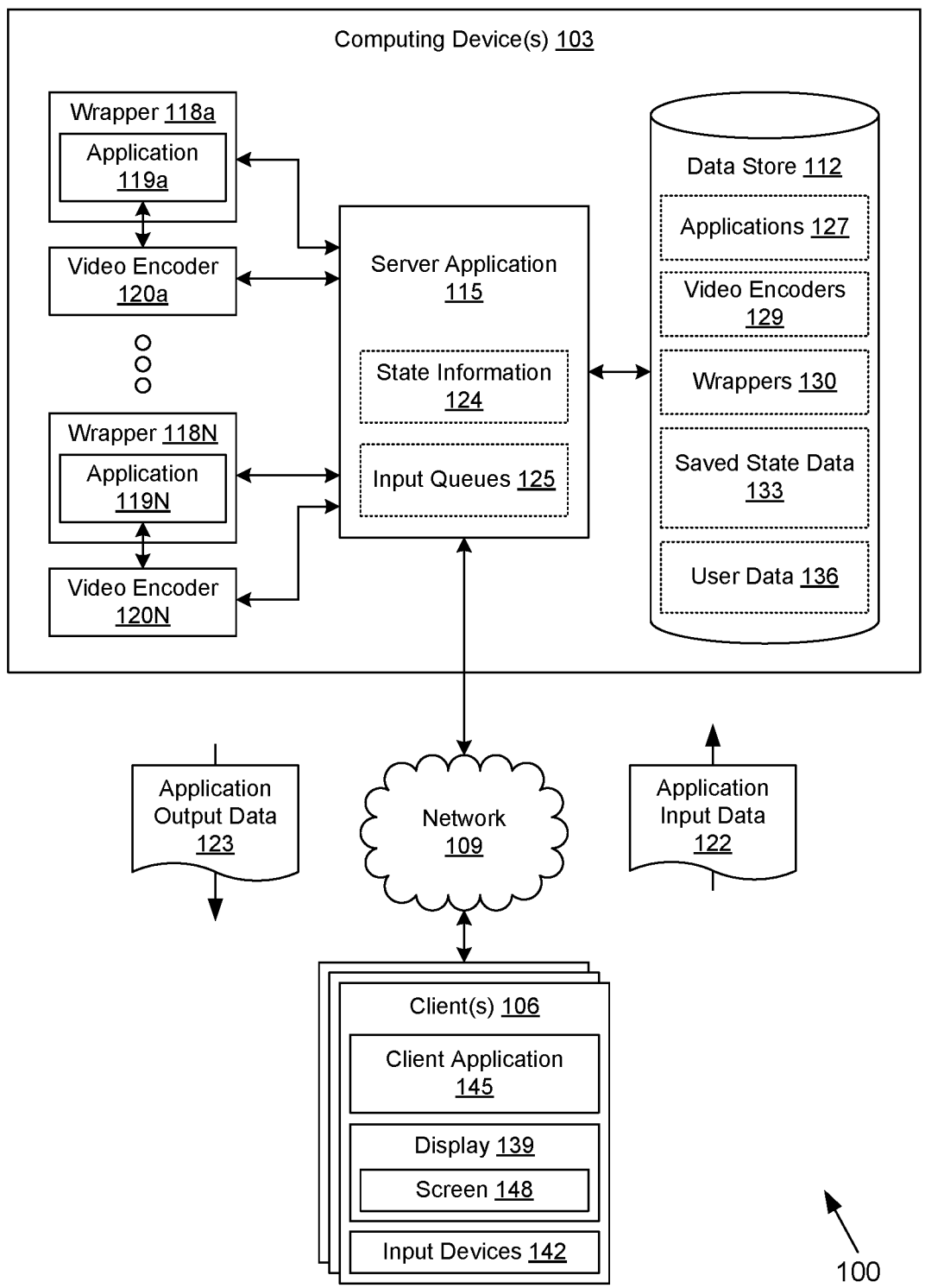
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a server application 115, a plurality of wrappers 118a . . . 118N, a plurality of applications 119a . . . 119N, a plurality of video encoders 120a . . . 120N, and other applications, services, processes, systems, engines, or functionality not discussed in detail herein. The server application 115 may correspond to a game server application or another type of application session server. The server application 115 is executed to launch applications 119, which are executed within the wrappers 118. The server application 115 is also executed to obtain application input data 122 from the clients 106 and provide the application input data 122 to the respective wrapper 118.

The server application 115 is also executed to send application output data 123 that is captured from the application 119 to the clients 106. The server application 115 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The server application 115 is configured to maintain state information 124 and input queues 125 associated with the executing applications 119.

The application 119 may correspond, for example, to a game or other types of applications. As non-limiting examples, the application 119 may correspond to a first-person shooter game, an action game, an adventure game, a party game, a role-playing game, a simulation game, a strategy game, a vehicle simulation game, and/or other types of games. The application 119 may be a game originally designed for execution in a general-purpose computing device or in a specialized video game device such as, for example, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The wrapper 118 corresponds to an application that provides a hosted environment for execution of the application 119. In various embodiments, the wrapper 118 may be configured to provide a virtualized environment for the application 119 by virtualizing one or more of the resources that the application 119 expects to access. Such resources may include a keyboard, a mouse, a joystick, a video device, a sound device, etc. In this way, the wrapper 118 is able to provide input commands to the application 119 as if the wrapper 118 emulates a keyboard, a mouse, or another type of input device.

Further, the wrapper 118 is able to obtain a video signal generated by the application 119 as if the wrapper 118 emulates a display device, an audio device, or another type of output device. The wrapper 118 is able to encode the video signal by way of a video encoder 120 into a media stream. The media stream may include an audio signal generated by the application 119 as well. To this end, the wrapper 118 may include various types of video encoders 120, such as, for example, Moving Pictures Experts Group (MPEG) encoders, H.264 encoders, Flash® video encoders, etc. Such video encoders 120 may be selected according to factors such as, for example, data reduction, encoding quality, latency, etc. In some embodiments, the wrappers 118 may communicate directly with the clients 106 to obtain the application input data 122 and to serve up the application output data 123.

Different types of wrappers 118 may be provided for different applications 119 or classes of applications 119. As non-limiting examples, different wrappers 118 may be provided for applications 119 using different application programming interfaces (APIs) such as OpenGL®, DirectX®, the Graphics Device Interface (GDI), and so on. Where the application 119 is configured for execution in a specialized video game device or another type of computing device, the wrapper 118 may include an emulation application that emulates the device. In some embodiments, the output of the application 119 may be captured by the wrapper 118 at a device level. For example, the application 119 may be executed in a physical game console, and the video output may be captured by way of a video graphics array (VGA) connection, a high-definition multimedia interface (HDMI) connection, a component video connection, a national television system committee (NTSC) television connection, and/or other connections.

The state information 124 that is maintained by the server application 115 includes various data relating to application sessions that are currently active. For example, the state information 124 may track the users that are currently participating in the application session, status information associated with the users, security permissions associated with the application session (e.g., who can or cannot join), and so on. In some embodiments, some or all of the state information 124 may be discarded when an application session ends. The input queues 125 collect input commands from the application input data 122 for a given application 119. The input commands may be reordered to a correct sequence and delays may be inserted between commands to ensure that they are interpreted correctly when presented to the corresponding application 119.

The data stored in the data store 112 includes, for example, applications 127, video encoders 129, wrappers 130, saved state data 133, user data 136, and potentially other data. The applications 127 correspond to a library of different applications that are available to be launched as applications 119. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 119 for multiple application sessions.

The video encoders 129 correspond to the various types of video encoders 120 that may be employed in the computing device 103. Some video encoders 129 may correspond to specific formats, such as, for example, H.264, MPEG-4, MPEG-2, and/or other formats. The wrappers 130 correspond to the executable code that implements the various types of wrappers 118. The wrappers 130 are executable in the computing device 103 and may be executed as multiple instances of the wrappers 118 for multiple game sessions.

The saved state data 133 corresponds to game states that have been saved by the applications 119. Because the applications 119 may be executed in a virtualized environment, the applications 119 may write state information to a virtual location, which is then mapped for storage in the data store 112 as the saved state data 133. The saved state data 133 may correspond to data saved normally by the application 119 or may correspond to a memory image of the application 119 that may be resumed at any time. The user data 136 includes various data related to the users of the applications 119, such as, for example, security credentials, application preferences, billing information, a listing of other users that are permitted to join application sessions started by the user, and so on.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices 142 may incorporate haptic technologies in order to provide feedback to the user.

The client 106 may be configured to execute various applications such as a client application 145 and/or other applications. The client application 145 is executed to allow a user to launch, join, play, or otherwise interact with an application 119 executed in the computing device 103. To this end, the client application 145 is configured to capture input commands provided by the user through one or more of the input devices 142 and send this input over the network 109 to the computing device 103 as application input data 122.

The client application 145 is also configured to obtain application output data 123 over the network 109 from the computing device 103 and render a screen 148 on the display 139. To this end, the client application 145 may include one or more video and audio players to play out a media stream generated by an application 119. In one embodiment, the client application 145 comprises a plug-in within a browser application. The client 106 may be configured to execute applications beyond the client application 145 such as, for example, browser applications, email applications, instant message applications, and/or other applications. In some embodiments, multiple clients 106 may be employed for one or more users to interact with the application 119. As non-limiting examples, some clients 106 may be specialized in display output, while other clients 106 may be specialized in obtaining user input. It is noted that different clients 106 may be associated with different latency requirements which may affect a delay employed before providing input commands to the application 119.

Next, a general description of the operation of the various components of the networked environment 100 is provided. To begin, a user at a client 106 sends a request to launch an application 119 to the server application 115. The server application 115 obtains the corresponding application 127, video encoder 129, and wrapper 130 from the data store 112. The server application 115 then launches the application 119 in the corresponding wrapper 118. The server application 115 tracks the status of the application 119 within the state information 124.

The wrapper 118 provides a hosted environment for execution of the application 119. In some embodiments, the hosted environment may include a virtualized environment for the application 119 that virtualizes one or more resources of the computing device 103. Such resources may include exclusive resources, i.e., resources for which the application 119 requests exclusive access. For example, the application 119 may request full screen access from a video device, which is an exclusive resource because normally only one application can have full screen access. Furthermore, the wrapper may virtualize input devices such as, for example, keyboards, mice, etc. which may not actually be present in the computing device 103. In various embodiments, the wrapper 118 may correspond to a virtual machine and/or the wrapper 118 may be executed within a virtual machine.

The user at the client 106 enters input commands for the application 119 by use of the input devices 142 of the client 106. As a non-limiting example, the user may depress a left mouse button. Accordingly, the client application 145 functions to encode the input command into a format that may be transmitted over the network 109 within the application input data 122. The server application 115 receives the input command, adds it to the input queue 125 for the application 119, and ultimately passes it to the wrapper 118. The wrapper 118 then provides a left mouse button depression to the application 119 by way of a virtualized mouse.

It is noted that variable latency characteristics of the network 109 may cause some input commands to be misinterpreted by the application 119 if the input commands are provided to the application 119 as soon as they are received. As a non-limiting example, two single clicks of a mouse button may be misinterpreted as a double click if the first single click is delayed by the network 109 by a greater amount than the second single click. Similarly, mouse clicks and mouse drags may be misinterpreted if the relative temporal relationship between certain input commands is not preserved.

As another non-limiting example, suppose that the application 119 corresponds to a game application within the fighting game genre, e.g., Mortal Kombat, Street Fighter, etc. The user at the client 106 may perform a series of complicated moves through a rapid sequence of input commands. If the input commands are subject to variable latency over the network 109, the series of moves may be misinterpreted by the application 119, thereby resulting in the character controlled by the user not performing the intended moves. For instance, two buttons may need to be pressed within a certain period of time to perform a punch move successfully. If the second input command is delayed by the network 109, but the first input command is not, the move may be unsuccessful without any fault of the user. To remedy this, the server application 115 may delay the first input command to preserve the relative temporal relationship between the first and second input commands. In so doing, the gesture, or command sequence, performed by the user is preserved for the application 119.

Although the additional delay used may be predetermined, it may also be calculated based on the difference between the time period between the commands when generated in the client 106 and the time period between when the commands are received by the server application 115. The time period between the commands when generated in the client 106 may be determined by referring to timestamps in metadata associated with the commands. It is noted that the various fixed latencies in the system (e.g., video encoding delay, minimum network latency) might not adversely impact the functionality of the application 119.

Various techniques related to adding latency and accommodating latency are described in U.S. Patent Application entitled "Adding Latency to Improve Perceived Performance" filed on Oct. 29, 2010 and assigned application Ser. No. 12/916,111, and in U.S. Patent Application entitled "Accommodating Latency in a Service-Based Application" filed on Sep. 17, 2010 and assigned application Ser. No. 12/885,296, both of which are incorporated herein by reference in their entirety.

In some cases, the delay in providing the input command to the application 119 may depend at least in part on a video frame region that is associated with the input command. As a non-limiting example, with an application 119 that is a game, it may be important to delay an input command relating to game play to preserve the meaning of the input command. However, the game screen 148 may also include a chat window, and the input command may be text to be sent to another player in the game by way of the chat window. If the input command relates to the chat window, the wrapper 118 may be configured to provide the input command to the application 119 without additional delay. That is, it may be preferable to send the text to the other user as soon as possible. Accordingly, the delay may depend on whether the input command is related to the region of the screen 148 that is the chat window. Also, it is understood that an application 119 may have multiple modes, where one mode is associated with a delay in providing input commands while another is not.

It may also be important to ensure that the input command is synchronized with the video frame presented to the user on the screen 148 when the user generated the input command in the client 106. As a non-limiting example, because of the various latencies of the system, a fireball intended to be thrown by the character controlled by the user in a fighting game may be thrown later than intended. In some cases, this may not matter. For example, the user may merely want to throw the fireball, and a short delay in throwing the fireball may be perfectly acceptable to the user. However, for more precision, the application 119 may support an application programming interface (API) that allows the wrapper 118 to associate a frame number or other temporal identifier with an input command. Therefore, the application 119 can know precisely when the input command was performed and react accordingly. The frame number or other temporal identifier may be sent to the server application 115 by the client application 145 as metadata for the input command.

In some embodiments, different input commands may be presented to the application 119 from those that were generated by a client 106. As a non-limiting example, if a user sends a mouse down command and the client application 145 loses focus, the wrapper 118 may be configured to send a mouse down command followed by a mouse up command. In various embodiments, the input commands may be relayed to the wrapper 118 as soon as possible, or the input commands may be queued by the wrapper 118 in the input queue 125 and relayed to the application 119 sequentially from the queue according to another approach.

Meanwhile, the graphical output of the application 119 is captured by the wrapper 118 and encoded into a media stream. Additionally, the audio output of the application 119 may be captured and multiplexed into the media stream. The graphical output and/or audio output of the application 119 may be captured by hardware devices of the computing device 103 in some embodiments. The media stream is transmitted by the server application 115 to the client 106 over the network 109 as the application output data 123. The client application 145 obtains the application output data 123 and renders a screen 148 on the display 139.

Subsequently, other users may join the application 119 and participate like the first user. A user may start an application 119 at one client 106 and continue the application 119 at another client 106. Furthermore, multiple users at diverse locations may participate in an application 119. As a non-limiting example, an application 119 may have been developed to be executed in one device with multiple game controllers. Accordingly, the wrapper 118 may be configured to map input commands from one client 106 to a first virtual game controller and input commands from another client 106 to a second virtual game controller. As another non-limiting example, an application 119 may have been developed to be executed in one device, where one side of the keyboard controls the first player and the other side of the keyboard controls the second player. Accordingly, the wrapper 118 may be configured to map input commands from one client 106 to keys on one side of a virtual keyboard and input commands from another client 106 to keys on another side of the virtual keyboard.

Various embodiments enable input generated through one type of input device 142 in a client 106 to be transformed by the wrapper 118 into input commands provided to the application 119 through an entirely different type of virtual input device. As a non-limiting example, input generated by an accelerometer in the client 106 may be translated by the wrapper 118 into input provided through a virtual mouse. Thus, completely different kinds of input devices 142 may be used in the application 119 that may not have been contemplated when the application 119 was implemented.

Where the input devices 142 incorporate haptic technologies and devices, force feedback may be provided to the input devices 142 within the application output data 123. As a non-limiting example, a simulated automobile steering wheel may be programmed by force feedback to give the user a feel of the road. As a user makes a turn or accelerates, the steering wheel may resist the turn or slip out of control. As another non-limiting example, the temperature of the input device 142 may be configured to change according to force feedback. In one embodiment, force feedback generated from the application input data 122 of one client 106 may be included in the application output data 123 sent to another client 106.

Because the client 106 is decoupled from the hardware requirements of the application 119, the application 119 may be used remotely through a diverse variety of clients 106 that are capable of streaming video with acceptable bandwidth and latency over a network 109. For example, a game application 119 may be played on a client 106 that is a smartphone. Thus, the client 106 need not include expensive graphics hardware to perform the complex three-dimensional rendering that may be necessary to execute the application 119. By contrast, the hardware of the computing device 103 may be upgraded as needed to meet the hardware requirements of the latest and most computationally intensive applications 119. In various embodiments, the video signal in the media stream sent by the server application 115 may be scaled according to the bitrate and/or other characteristics of the connection between the computing device 103 and the client 106 over the network 109.

Figure 2:
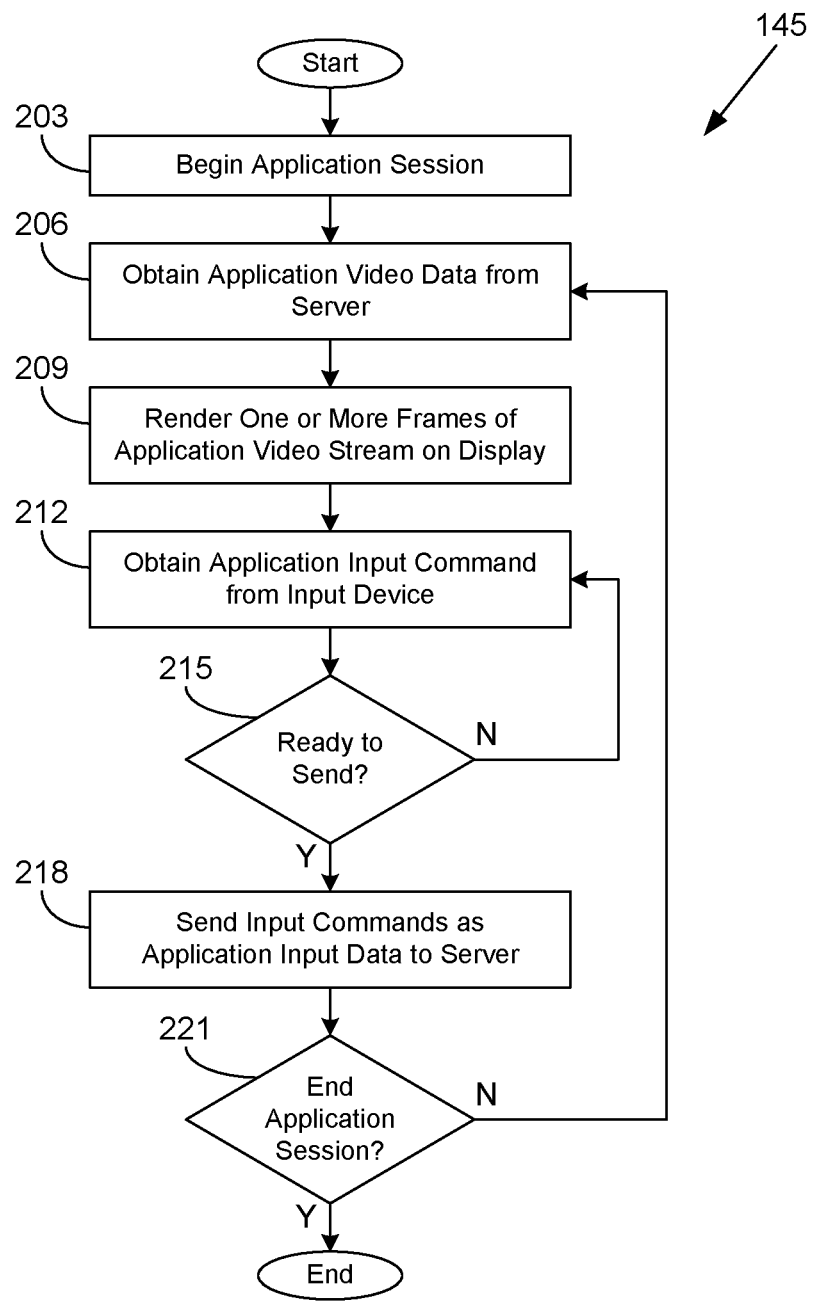
FIG. 2 is a flowchart illustrating one example of functionality implemented as portions of a server application executed in a computing device in the networked environment of FIG. 1 according to various embodiments of the present disclosure.

Referring next to FIG. 2, shown is a flowchart that provides one example of the operation of a portion of the client application 145 according to various embodiments. It is understood that the flowchart of FIG. 2 provides merely an example of the many different types of functional arrangements that may be employed to implement the operation of the portion of the client application 145 as described herein. As an alternative, the flowchart of FIG. 2 may be viewed as depicting an example of steps of a method implemented in the client 106 (FIG. 1) according to one or more embodiments.

Beginning with box 203, the client application 145 begins a session of an application 119 (FIG. 1) that is executed in the computing device 103 (FIG. 1). To this end, the client application 145 may send a request to the server application 115 (FIG. 1) to initiate a new session or to join an existing session of the application 119. In box 206, the client application 145 obtains application video data from the server application 115 in the application output data 123. In addition to video stream data, the application output data 123 may also include audio stream data, force feedback data, and/or other data associated with the application 119. In box 209, the client application 145 renders one or more frames of the application video stream in a screen 148 (FIG. 1) on the display 139 (FIG. 1).

In response to the graphical and/or other output of the application 119 presented in the client 106, the user of the client application 145 may employ one or more of the input devices 142 (FIG. 1) for interacting with the application 119. Accordingly, one or more input commands may be generated by the one or more input devices 142. In box 212, the client application 145 obtains an application input command from an input device 142. Non-limiting examples of such input commands may include a left mouse button pressed, a left mouse button released, a key press on the keyboard, a motion of a joystick, a button press on a game controller, etc.

In box 215, the client application 145 determines whether the input commands are ready to be sent to the server application 115. In one example, the input commands may be sent to the server application 115 as soon as they are generated by the input devices 142. In another example, input commands may be sent in batches of one or more input commands at specific intervals. Such batching may be useful to reduce packet header overhead, processing overhead, etc. In yet another example, multiple related input commands may be batched together. For instance, a mouse button down followed by a mouse button up may be transmitted together if they correspond to a single click. If the client application 145 determines that the input commands are not ready to be sent to the server application, the client application 145 returns to box 212 and obtains another application input command.

If the client application 145 instead determines that the input commands are ready to be sent, the client application 145 moves to box 218. In box 218, the client application 145 sends the input commands as application input data 122 (FIG. 1) to the server application 115. Along with the input commands, the application input data 122 may include various forms of metadata to ensure that the input commands are properly interpreted by the application 119. Such metadata may include a timestamp for each input command that indicates when the respective input command was generated in the client 106. Further, such metadata may include a video frame number or identifier to correlate a particular video frame with the input command. Other identifiers for correlating specific points in a media stream to input commands may be utilized in other embodiments.

Next, in box 221, the client application 145 determines whether the session of the application 119 is to be ended. For example, the user may decide to exit the application 119. In some embodiments, the application 119 may subsequently be terminated by the server application 115, while in other embodiments, the application 119 may continue executing in the computing device 103. If the application session is not to be ended, the client application 145 returns to box 206 and obtains additional application video data from the server application 115. Otherwise, the portion of the client application 145 ends.

Figure 3:
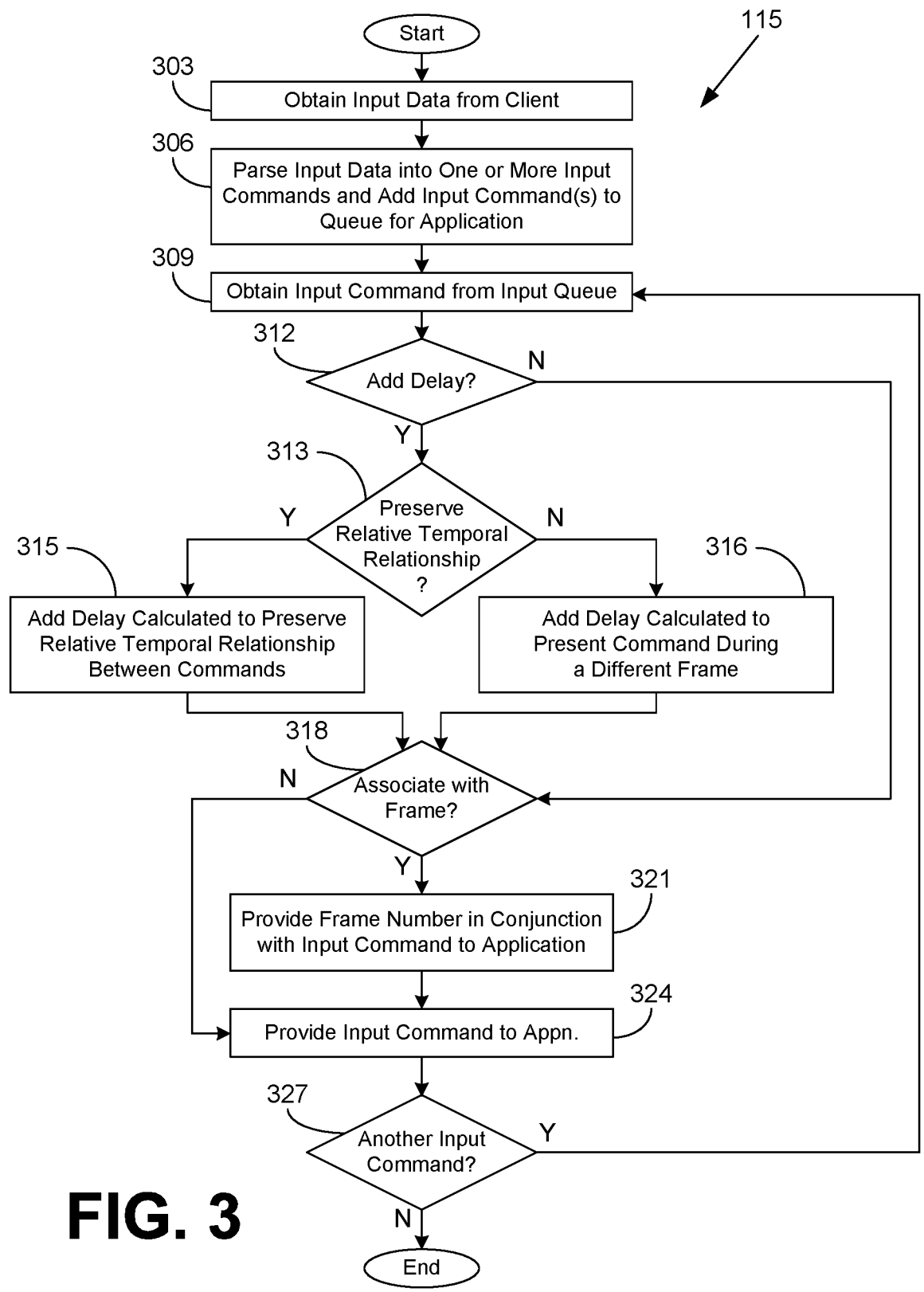
FIG. 3 is a flowchart illustrating one example of functionality implemented as portions of a client application executed in a client in the networked environment of FIG. 1 according to various embodiments of the present disclosure.

Moving on to FIG. 3, shown is a flowchart that provides one example of the operation of a portion of the server application 115 according to various embodiments. It is understood that the flowchart of FIG. 3 provides merely an example of the many different types of functional arrangements that may be employed to implement the operation of the portion of the server application 115 as described herein. As an alternative, the flowchart of FIG. 3 may be viewed as depicting an example of steps of a method implemented in the computing device 103 (FIG. 1) according to one or more embodiments.

Beginning with box 303, the server application 115 obtains application input data 122 (FIG. 1) from the client 106 (FIG. 1). In box 306, the server application 115 parses the application input data 122 into one or more input commands, with metadata, and adds the input command(s) to an input queue 125 (FIG. 1) for the corresponding application 119 (FIG. 1). In box 309, the server application 115 obtains an input command from the input queue 125 for processing.

In box 312, the server application 115 determines whether an additional delay should be added before providing the input command to the corresponding application 119 through the wrapper 118 in order to preserve the meaning of the input commands. In some cases, based on the type of input command or the type of application 119, the input command may be passed to the application 119 as soon as possible. However, such action may result in the misinterpretation of the input command by the application 119 by disturbing the relative temporal relationship between the input command and a previous or next input command. Also, with some applications 119, input commands may need to be provided to the application 119 during distinct video frames generated by the application to avoid undoing a change to the state of the application 119 effected by a previous input command in a video frame. For example, an X-button down followed by an X-button up during the same video frame may result in either action not being interpreted correctly by the application 119. If a delay is to be added, the server application 115 proceeds to box 313.

In box 313, the server application 115 determines whether the relative temporal relationship between the input commands is to be preserved. With some applications 119, the relative temporal relationship between the commands may be significant. For example, in various embodiments, the delay length may correspond to a difference between the time period between when the adjacent input commands were generated in the client 106 and the time period between when the adjacent input commands were obtained by server application 115. The time period between when the adjacent input commands were generated may be ascertained with reference to timestamps included in metadata for the input commands.

In other embodiments, the relative temporal relationship may not be crucial, and the delay length may be selected merely to ensure that the input commands are properly interpreted according to the input command types associated with the input commands. For example, the delay length may be selected to ensure that one input command is provided to the application 119 during a different video frame relative to a previous input command. Whether such an approach is employed may vary based on the application 119, a region of a video frame associated with the input command, and/or the particular type of input commands. In such cases, metadata accompanying the input commands may be omitted.

If the relative temporal relationship between the input commands is to be preserved, the server application 115 proceeds to box 315 and adds a delay calculated to preserve the relative temporal relationship between input commands. The server application 115 then continues to box 318. Otherwise, if the relative temporal relationship is not to be preserved, the server application 115 instead moves to box 316 and adds a delay calculated to present the input command to the application 119 during a different video frame relative to a previous input command. Thereafter, the server application 115 continues to box 318. If the server application 115 determines in box 312 that a delay is not to be added, the server application 115 also continues to box 318.

In box 318, the server application 115 determines whether the input command is to be associated with a video frame number or other temporal identifier associated with the output of the application 119. Such an identifier may be provided to the server application 115 as metadata of the input command. If the input command is to be associated with a frame number, the server application 115 provides the frame number in conjunction with the input command to the application 119 in box 321. The frame number or other temporal identifier may be provided to the application 119 by way of an application programming interface (API) supported by the application 119. The server application 115 then continues to box 324. If the input command is determined in box 318 not to be associated with a specific frame number, the server application 115 also proceeds to box 324.

In box 324, the server application 115 provides the input command to the application 119 by way of the wrapper 118 (FIG. 1). The wrapper 118, which virtualizes one or more input devices 142 (FIG. 1), provides the input command to the application 119 through such a virtualized input device 142. In various embodiments, the wrapper 118 may be configured to include the delay and/or provide the video frame number. In box 327, the server application 115 determines whether another input command remains in the input queue 125. If another input command remains in the input queue 125, the server application 115 returns to box 309 and obtains another input command from the input queue 125. Otherwise, the portion of the server application 115 ends.

Figure 4:
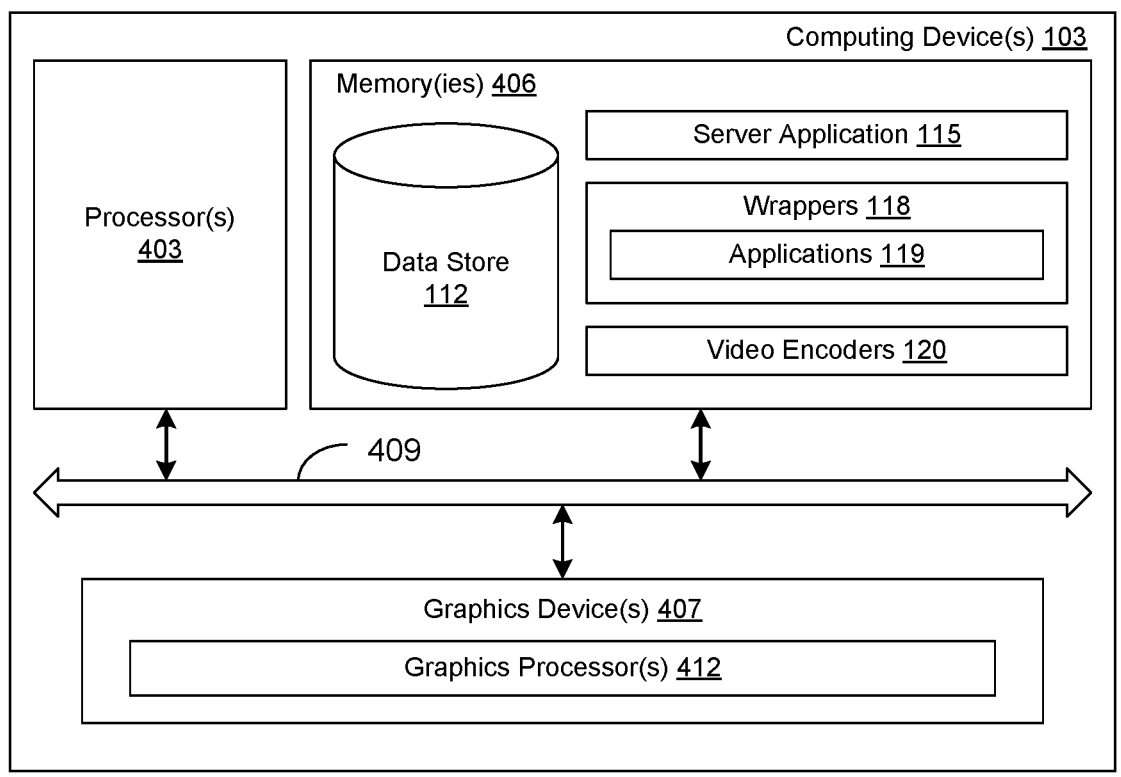
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403, a memory 406, and one or more graphics devices 407, all of which are coupled to a local interface 409. To this end, the computing device 103 may comprise, for example, at least one server computer or like device. The local interface 409 may comprise, for example, a data bus with an accompanying address/control bus or other bus structure as can be appreciated. The graphics devices 407 may correspond to high-performance graphics hardware, including one or more graphics processors 412. The graphics devices 407 are configured to render graphics corresponding to the applications 119 executed in the computing device 103.

Stored in the memory 406 are both data and several components that are executable by the processor 403. In particular, stored in the memory 406 and executable by the processor 403 are the server application 115, the wrappers 118, the applications 119, the video encoders 120, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the server application 115, the wrappers 118, the applications 119, the video encoders 120, the client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the client application 145 and the server application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the server application 115, the wrappers 118, the applications 119, the video encoders 120, and the client application 145, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a first computing device; and
a first application executable in the first computing device, wherein, when executed, the first application causes the first computing device to at least:
initiate a remote session over a network with a second application being executed in a hosted environment by at least one second computing device;
receive a video stream associated with a video signal being generated by the second application;
render the video stream on a display associated with the first computing device;
capture a first input command associated with a first input and a second input command associated with a second input; and
transmit application input data comprising the first input command and the second input command to the at least one second computing device, the second input command being provided to the second application after a delay based at least in part on a latency characteristic of the network,
wherein the delay preserves a relative temporal relationship between the first input command and the second input command.

2. The system of claim 1, wherein the first input command is associated with a first video frame of the video stream and the second input command is associated with a second video frame of the video stream, the first video frame being displayed when the first input command is generated and the second video frame being displayed when the second input command is generated.

3. The system of claim 1, wherein the network has a variable amount of latency.

4. The system of claim 1, wherein the delay is based at least in part a comparison of a first time period and a second time period, the first time period being between when the first input command was generated by the first computing device and when the second input command was generated by the first computing device and the second time period being between when the first input command is received by the at least one second computing device and when the second input command is received by the at least one second computing device.

5. The system of claim 1, wherein the first input command and the second input command are transmitted to the at least one second computing device in a batch.

6. A method, comprising:
initiating, by a first computing device, a remote session with an application being executed in a hosted environment by at least one second computing device;
rendering, by the first computing device, an application video output generated by the application on a display, the application video output being received from the at least one second device over a network;

receiving, by the first computing device, an input command from an input device, the input command corresponding to a video frame of the application video output being displayed when the input command is generated; and transmitting, by the first computing device, the input command and a video frame identifier to the at least one second computing device, the input command being provided to the application via the at least one second computing device after a delay that accounts for a latency characteristic of the network.

7. The method of claim 6, further comprising receiving another input command from the input device, the other input command corresponding to another video frame of the application video output, and the input command and the other input command being transmitted to the at least one second computing device in a batch.

8. The method of claim 6, wherein the delay is further determined based at least in part on an input command type associated with the input command.

9. The method of claim 6, wherein the network has a variable amount of latency.

10. The method of claim 6, further comprising encoding, via the first computing device, the input command prior to transmitting to the at least one second computing device.

11. The method of claim 6, wherein the input command is associated with a video frame generated by the application, the video frame having been displayed by the first computing device relative to the input command being generated.

12. A system, comprising:
a first computing device; and
a first application executable in the first computing device, wherein, when executed, the first application causes the first computing device to at least:
initiate a remote session with a second application being executed in a hosted environment by at least one second computing device;
render an application video output generated by the second application on a display, the application video output being received from the at least one second device over a network;
receive an input command from an input device, the input command corresponding to a video frame of the application video output being displayed when the input command is generated; and
transmit the input command and a video frame identifier to the at least one second computing device, the input command being provided to the second application via the at least one second computing device after a delay that accounts for a latency characteristic of the network.

13. The system of claim 12, wherein the network has a variable amount of latency.

14. The system of claim 12, wherein, when executed, the first application further causes the first computing device to at least generate application input data comprising the input command.

15. The system of claim 14, wherein the application input data includes the input command and a timestamp for the input command that indicates when the input command was generated by the first computing device.

16. The system of claim 12, wherein the application video output further comprises force feedback data for the input device.

17. The system of claim 12, wherein the application video output further comprises a video stream associated with a video signal.

18. The system of claim 17, wherein the application output data further comprises an audio stream multiplexed with the video stream.

19. The system of claim 12, wherein, when executed, the first application causes the first computing device to at least encode the input command prior to transmitting to the at least one second computing device.

20. The system of claim 12, wherein the input command is provided to the second application of at least one second computing device after a delay in order to preserve a relative temporal relationship between the input command and another input command.

* * * * *